(12) United States Patent
Sung et al.

(10) Patent No.: US 9,830,803 B2
(45) Date of Patent: Nov. 28, 2017

(54) ALARM MODULE HAVING MULTIPLE WIRELESS REMOTE ALARM DEVICES AND REMOTE ALARM METHOD

(71) Applicant: JetDian Technology, Inc., Taipei (TW)

(72) Inventors: Jui-Huei Sung, Taipei (TW);
Chin-Yuan Cheng, Taipei (TW);
Kuan-Chun Wang, Taipei (TW)

(73) Assignee: Jetdian Technology, Inc., Taipei (TW)

( * ) Notice: Subject to any disclaimer, the term of this patent is extended or adjusted under 35 U.S.C. 154(b) by 280 days.

(21) Appl. No.: 14/865,433

(22) Filed: Sep. 25, 2015

(65) Prior Publication Data

US 2016/0093201 A1  Mar. 31, 2016

(30) Foreign Application Priority Data

Sep. 26, 2014 (TW) .............................. 103133530 A (51) Int. Cl.
| | | |
|---|---|---|
| G08B 1/08 | (2006.01) | |
| G08B 25/10 | (2006.01) | |
| H04L 29/08 | (2006.01) | |
| G08B 21/02 | (2006.01) | |
| G08B 25/00 | (2006.01) | |

(52) U.S. Cl.
CPC ......... G08B 25/10 (2013.01); G08B 21/0227 (2013.01); G08B 25/009 (2013.01); H04L 67/26 (2013.01)

(58) Field of Classification Search
CPC .......................... G08B 21/0227; G08B 25/009

USPC ................ 340/539.11, 506, 988, 426.16
See application file for complete search history.

(56) References Cited

U.S. PATENT DOCUMENTS

| | | | | |
|---|---|---|---|---|
| 9,275,549 | B2* | 3/2016 | Ando .................... | G08G 1/22 |
| 9,396,661 | B2* | 7/2016 | Okamoto .............. | G08G 1/22 |
| 9,423,794 | B2* | 8/2016 | Lind .................... | G05D 1/0278 |
| 2009/0012666 | A1* | 1/2009 | Simpson ............... | A61G 5/04 |
| | | | | 701/23 |
| 2010/0256852 | A1* | 10/2010 | Mudalige .............. | G08G 1/163 |
| | | | | 701/24 |

\* cited by examiner

*Primary Examiner* — Phung Nguyen
(74) *Attorney, Agent, or Firm* — Wang Law Firm, Inc.

(57) ABSTRACT

A remote alarm method, including the following steps: during a predetermined time, at least one of the wireless remote alarm devices sends a push signal including the corresponding representative data; the processor analyzes the output, and suppose the corresponding representative data is not included, then the corresponding representative data will be added therein and the wireless push transmitter will be driven to continuously send the updated push signal including the added corresponding representative data; when the main alarm device receives the updated push signal, the processor thereof compares it with all of the corresponding representative data in the closed group to check the inclusion of each corresponding representative data in the closed group; and in case of lacking any corresponding representative data, the alarm indicator can be driven to send an alarm signal.

10 Claims, 8 Drawing Sheets

ALARM MODULE HAVING MULTIPLE WIRELESS REMOTE ALARM DEVICES AND REMOTE ALARM METHOD

FIELD OF THE INVENTION

The present invention discloses an alarm module having multiple wireless remote alarm devices and a remote alarm method.

BACKGROUND OF THE INVENTION

It is known that bicycles are now getting popular as a tool for recreational activities, and many people may ride a bicycle to travel outdoors along with their families or friends during weekends or holidays. However, not every cyclist may proceed at the same speed, nor can all of the companions fully appreciate the entire travel route; suppose certain changes occur along the road or a larger difference in riding speed does exist, it is possible some member cyclists may delay or fall behind the queue. In such cases, the most secured solution is the frontal cyclists stop spontaneously and wait for their member cyclists to catch up, and at the same time make a phone call or use the radio walkie-talkie to inform his/her companions falling behind to join. Whereas, if the communication is difficult or even unavailable, the leading cyclists may need to return along the same path to search for other companions, which may undesirably procrastinate the original biking schedule and adversely affect the pleasure of outdoor cycling sport. Especially, assuming the queue is relatively extensive and the central members have dispersed along the route, the signal may take a longer while to get to the leaders located at the front, so the distance may be further stretched out thus wasting even more time in waiting and searches.

In addition, outdoor tours for young children studying in elementary schools or even kindergartens typically require at least two teachers respectively arranged at the foremost and the backmost positions in order to attend the students closely thereby preventing various possible accidental events from happening. But, sometimes the distance between the team members may be quite large, so the foremost and backmost teachers are not able to appreciate and control all current situations of the students in the group immediately in a convenient way; as a result, at the moment the teachers really realize one or more member students are missing, the traces of such lost students may have already disappeared, thus potentially leading to any possible unfortunate outcomes. So far, except relying on the teachers to be more attentive on the dynamic situations of the students and allowing the students to wear a card or a tag illustrating the contact information about the teachers, no better protective measures can be taken on this issue. On the other hand, during a trip, a user may need to leave his or her hand-carry devices (such as a bicycle or a luggage) for any reason for a while, and typically have to lock it up for safety. However, for professional burglars, such a lock-up action may not suffice to prevent illegal behaviors, so it is possible the user does not realize the personal belongings actually have been stolen until the moment the user steps out from a store or a restroom, thus leading to heavy pressure on the user psychologically.

In current communication technologies, there exists a type of "push" technology which can be applied to search for the inter-connected communication devices within a finite range, and uni-directionally transmit various messages, e.g., advertisements, emails or calendar contents, in order to enable the effects of public announcements or notifications.

Accordingly, the present invention attempts to offer a remote alarm method applicable for an alarm module, which can utilize the connections between a user's hand-carry wireless communication device (for example, a mobile phone or a tablet computer enabling communication function) and a target (such as the mobile phone or a tablet computer enabling communication function of a companion, a contact tag worn by a student, or even a bicycle or a luggage) by means of wireless transmission technologies, such that, through the push operations between the user's wireless communication device and the target, the effective communication distance of each device can be mutually extended, rather than simply relying on conventional one-by-one contacts and confirmations. Once a member in a preset group completely disengages from the extended effective communication distance of all communication devices of the rest members, an alarm indicator (e.g., a speaker or a display panel on a wireless communication device) in a main alarm device may directly send out a notice such that the holder of the main alarm device can promptly appreciate the situation and take corresponding reactive measures. At the same time, this can also prevent burglars from arbitrarily meddling the user's personal belongings.

SUMMARY OF THE INVENTION

An objective of the present invention lies in providing a remote alarm method, in which a user is allowed to use a wireless transmission device, e.g., a mobile phone or a tablet computer enabling communication function, to build a closed group with one or more targets by means of wireless transmission technologies. With the limitation on the effective communication distance, once a target exits from the effective communication distance, the mobile phone or the tablet computer enabling communication function of the user may send an alarm notification thereby offering an improved protective measure.

Another objective of the present invention is characterized in providing a remote alarm method, in which, through a wireless push approach, all of the effective communication distances in the closed group can be appended in chain such that the effective communication distance with regards to the closed group may be effectively extended to a maximum degree, instead of being simply based on the peer-to-peer transmissions.

Yet another objective of the present invention is to provide a remote alarm method, in which, through the conjunctive operations between a mobile phone or a tablet computer enabling communication function and one or more targets, it is allowed to maintain the current habits of a user in order to facilitate the user's applications thereby enhancing the flexibility in use.

To achieve the objectives set forth hereinbefore, the present invention discloses a remote alarm method, which is applicable to an alarm module comprising a plurality of wireless remote alarm devices mutually forming a closed group, with at least one of the wireless remote alarm devices being configured to be the main alarm device; wherein, each of the wireless remote alarm devices respectively has a corresponding representative data; a memory, used to store the corresponding representative data for each of the wireless remote alarm devices in the closed group; a wireless push transmitter, used to output a push signal within an effective communication distance; a wireless push receiver, used to receive the push signal transmitted by any other one of the wireless remote alarm devices in the closed group and convert it into an electrical signal output; as well as a processor, and the main alarm device further includes an alarm indicator; in which the remote alarm method comprises the following steps: (a) during a predetermined time, at least one of the wireless remote alarm devices sends a push signal including its own corresponding representative data; (b) other wireless remote alarm devices located within the effective communication distance from the above-said wireless remote alarm device respectively receive the push signal by means of its own wireless push receiver and convert it into the electrical signal output to its own processor; (c) the processor receives and analyzes the electrical signal, and suppose the received electrical signal does not include its own corresponding representative data of the wireless remote alarm device, then the wireless remote alarm device adds its own corresponding representative data therein and drives the wireless push transmitter to continuously send the updated push signal including the added corresponding representative data of its own; (d) when the main alarm device receives the updated push signal, the processor in the main alarm device compares the electrical signal coming from its wireless push receiver with the corresponding representative data of all wireless remote alarm devices in the closed group thereby confirming the electrical signal contains the corresponding representative data for each of the devices in the closed group; and (e) in case that the electrical signal lacks the corresponding representative data for any one of the wireless remote alarm devices, the processor in the main alarm device drives the alarm indicator to send an alarm signal.

Moreover, the aforementioned alarm module comprises: a plurality of wireless remote alarm devices mutually forming a closed group; wherein, each of the wireless remote alarm devices respectively has a corresponding representative data, and each of the wireless remote alarm devices respectively includes: a memory, used to store the corresponding representative data for each of the wireless remote alarm devices in the closed group; a wireless push transmitter, used to output a push signal within an effective communication distance; a wireless push receiver, used to receive the push signal transmitted by any other one of the wireless remote alarm devices in the closed group and convert it into an electrical signal output; and a processor, used to receive the electrical signal from the wireless push receiver and compare the electrical signal, and suppose the electrical signal does not include its own corresponding representative data of the wireless remote alarm device, then the wireless remote alarm device adds its own corresponding representative data therein and drives the wireless push transmitter to continuously send the updated push signal already including the added corresponding representative data of its own; and at least one wireless remote alarm device is configured to be the main alarm device among such wireless remote alarm devices, and the main alarm device further includes an alarm indicator such that the processor in the main alarm device analyzes and compares the electrical signal to check whether the electrical signal has already included the corresponding representative data for each of the wireless remote alarm devices, and in case the electrical signal lacks the corresponding representative data for any one of the wireless remote alarm devices, the alarm indicator can be driven to send an alarm signal.

The remote alarm method disclosed by the present invention applies the effective communication distance of the wireless remote alarm device as an approach for limiting the distance between a target and the main alarm device such that, through the auxiliary reminding by the alarm indicator, the user can be promptly aware of the abrupt situations thereby reacting accordingly. Hence, the user needs not to search for companions in a less convenient fashion, and it is possible to prevent burglars from pilfering the user's belongings stealthily so as to secure the user's personal properties. In addition, when a user takes a mobile phone or a tablet computer enabling communication function, for example, as the wireless remote alarm device, the user may habitually maintain the power for operations rather than depleting the electricity thereof. Therefore, the user is allowed to keep the current operation habits thus saving the user's troubles.

DETAILED DESCRIPTION OF THE ILLUSTRATED EMBODIMENTS

The aforementioned and other technical contents, aspects and effects in relation with the present invention can be clearly appreciated through the detailed descriptions concerning the preferred embodiments of the present invention in conjunction with the appended drawings; moreover, in each embodiment, the same components will be denoted with similar numbers.

Figure 1:
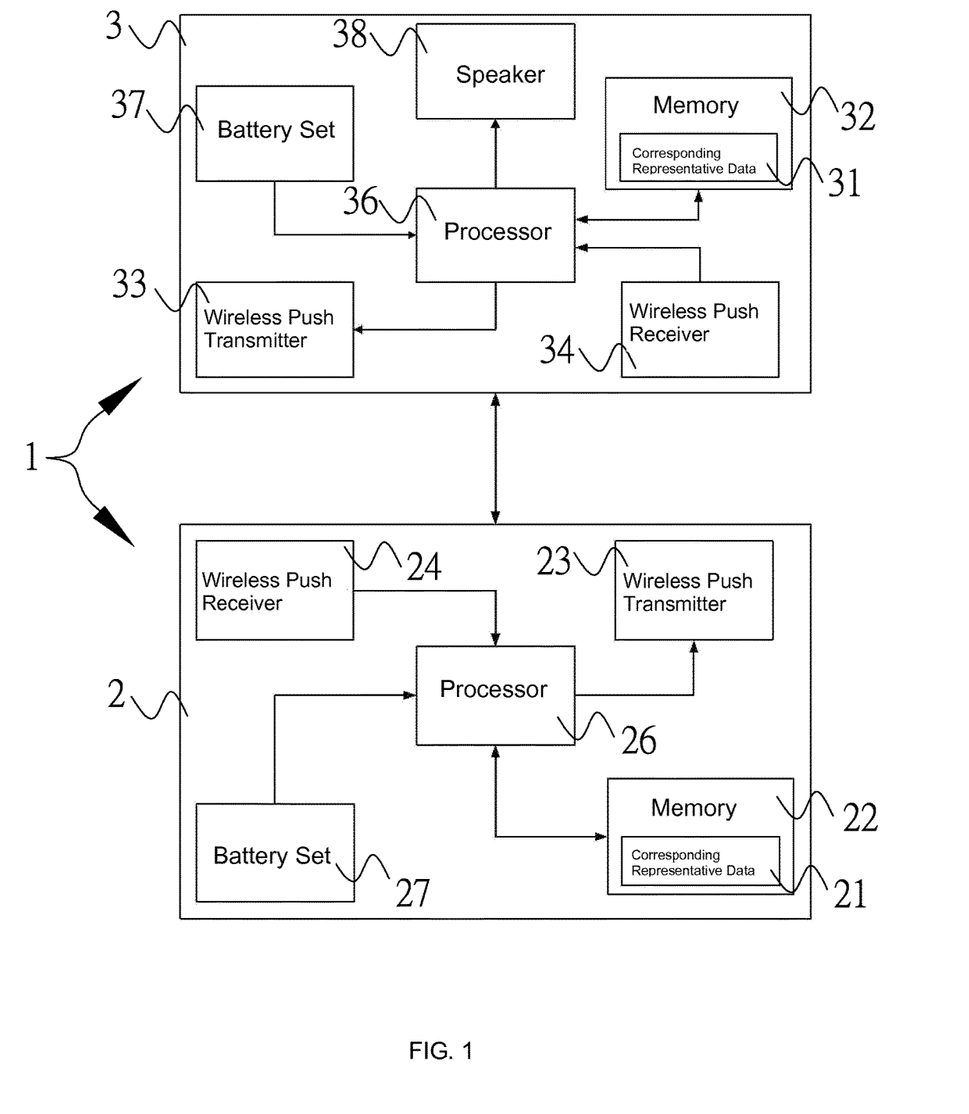
FIG. 1 shows a block diagram for a first preferred embodiment according to the present invention, illustrating the interactions between a mobile phone and an electronic lock.
Figure 2:
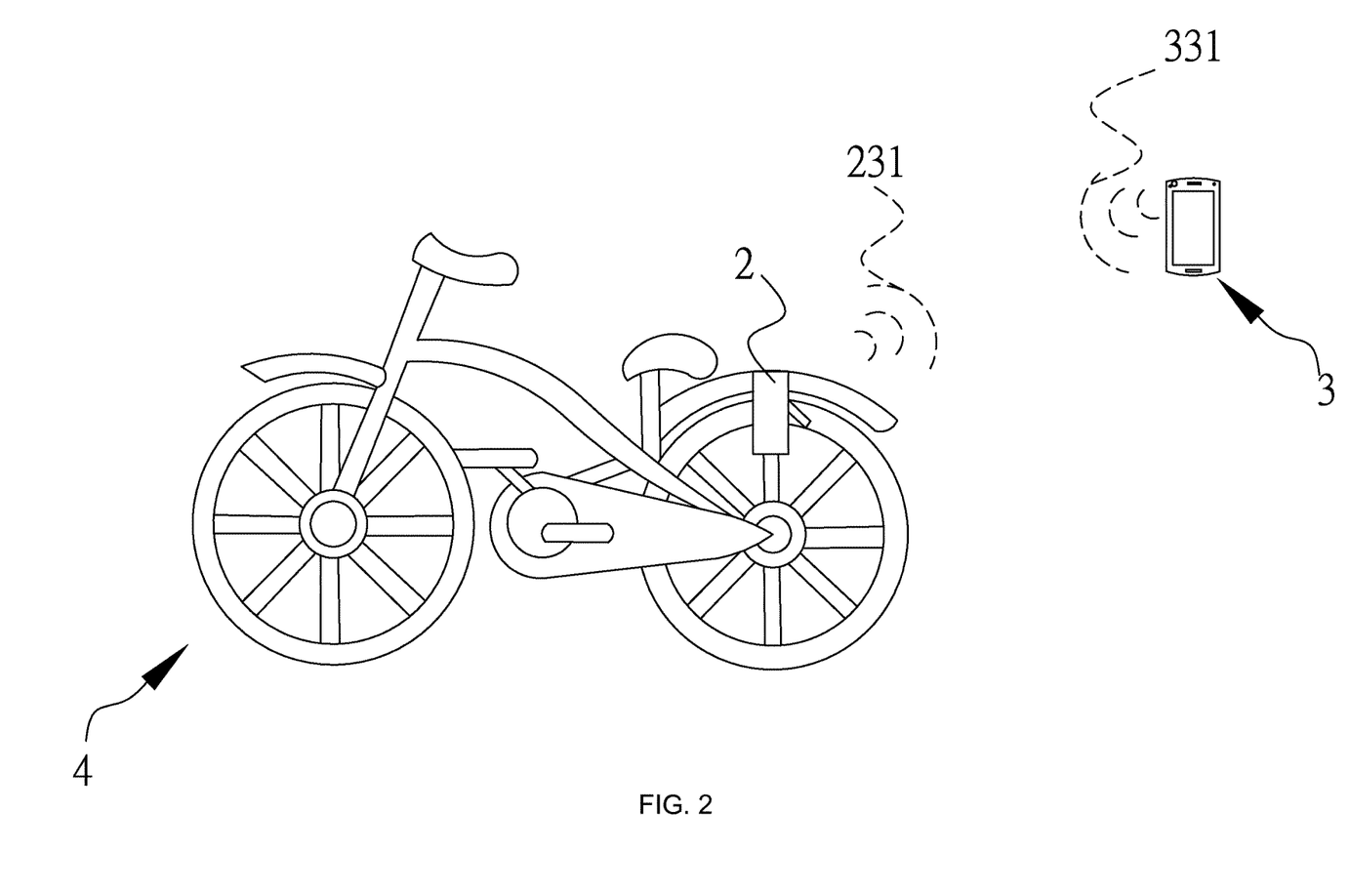
FIG. 2 shows a view for the first preferred embodiment according to the present invention, illustrating the matching process performed via wireless transmissions by means of a mobile phone and an electronic lock installed on a bicycle.

Initially, a first preferred embodiment for the alarm module having multiple wireless remote alarm devices and remote alarm method according to the present invention is illustrated. As shown in FIGS. 1 and 2, an alarm module 1 comprises a plurality of wireless remote alarm devices, and at least one of such wireless remote alarm device is configured to be a main alarm device; here in the present embodiment a single cyclist and his/her bicycle are exemplified as a group. Also, the wireless alarm device in the present embodiment is exemplarily shown as an electronic lock 2 installed on the bicycle 4; meanwhile, the main alarm device is illustrated as a smartphone 3 carried by the cyclist. Herein the electronic lock 2 and the smartphone 3 respectively includes a corresponding representative data 21, 31, and the corresponding representative data of the electronic lock 2 includes the information about the electronic lock serial number and the corresponding representative data of the smartphone 3 includes information concerning the mobile phone serial number, the SIM card serial number or the like; moreover, the corresponding representative data 21, 31 of the electronic lock 2 and the smartphone 3 is respectively stored in its own memory 22, 32. Although a bicycle is exemplified in the present embodiment, those skilled ones in the art can spontaneously appreciate that the application on other hand-carry devices, such as a luggage, may achieve the same effect as well.

Figure 3:
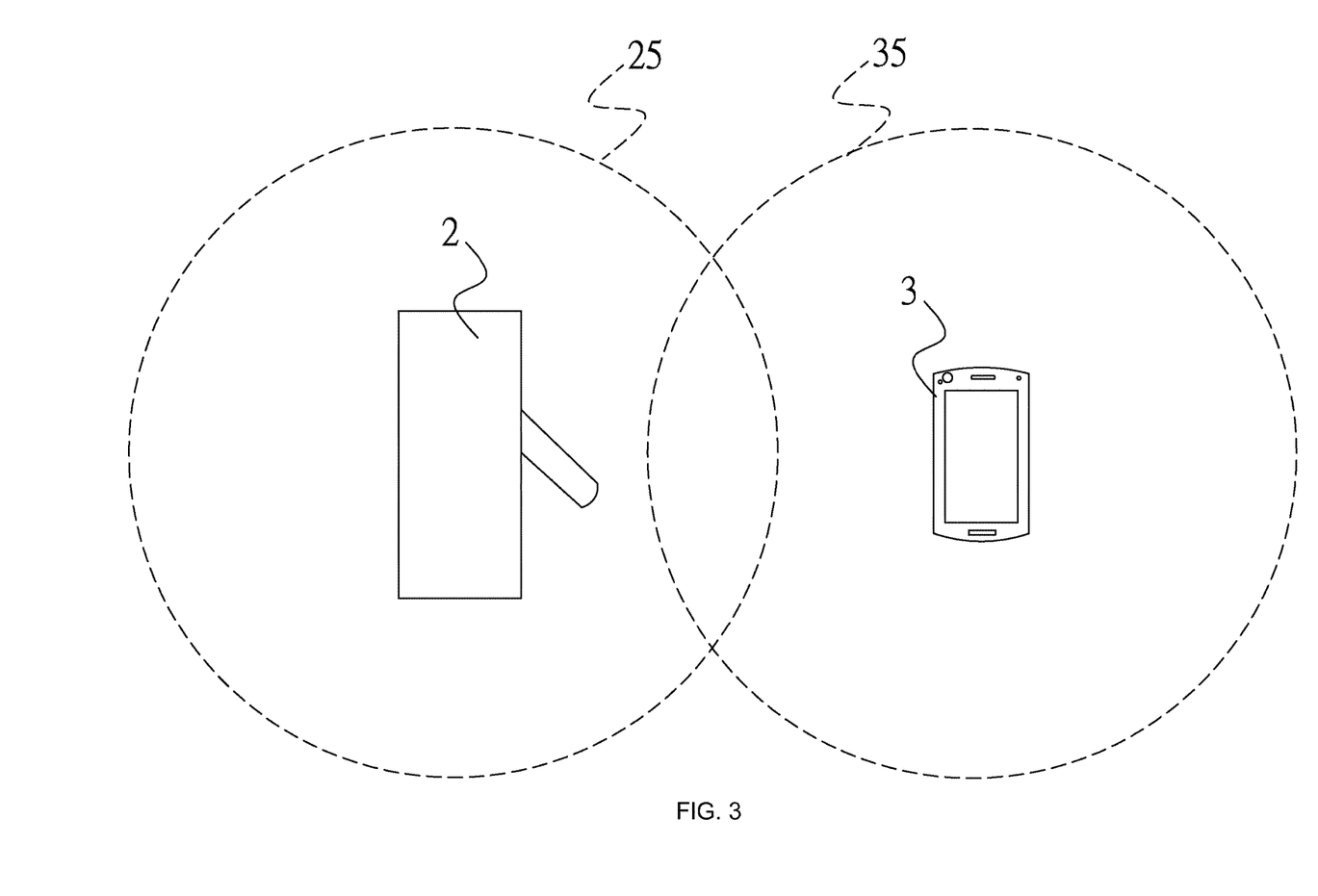
FIG. 3 shows the first preferred embodiment according to the present invention, illustrating that the mobile phone and the electronic lock respectively has an effective communication distance.
Figure 4:
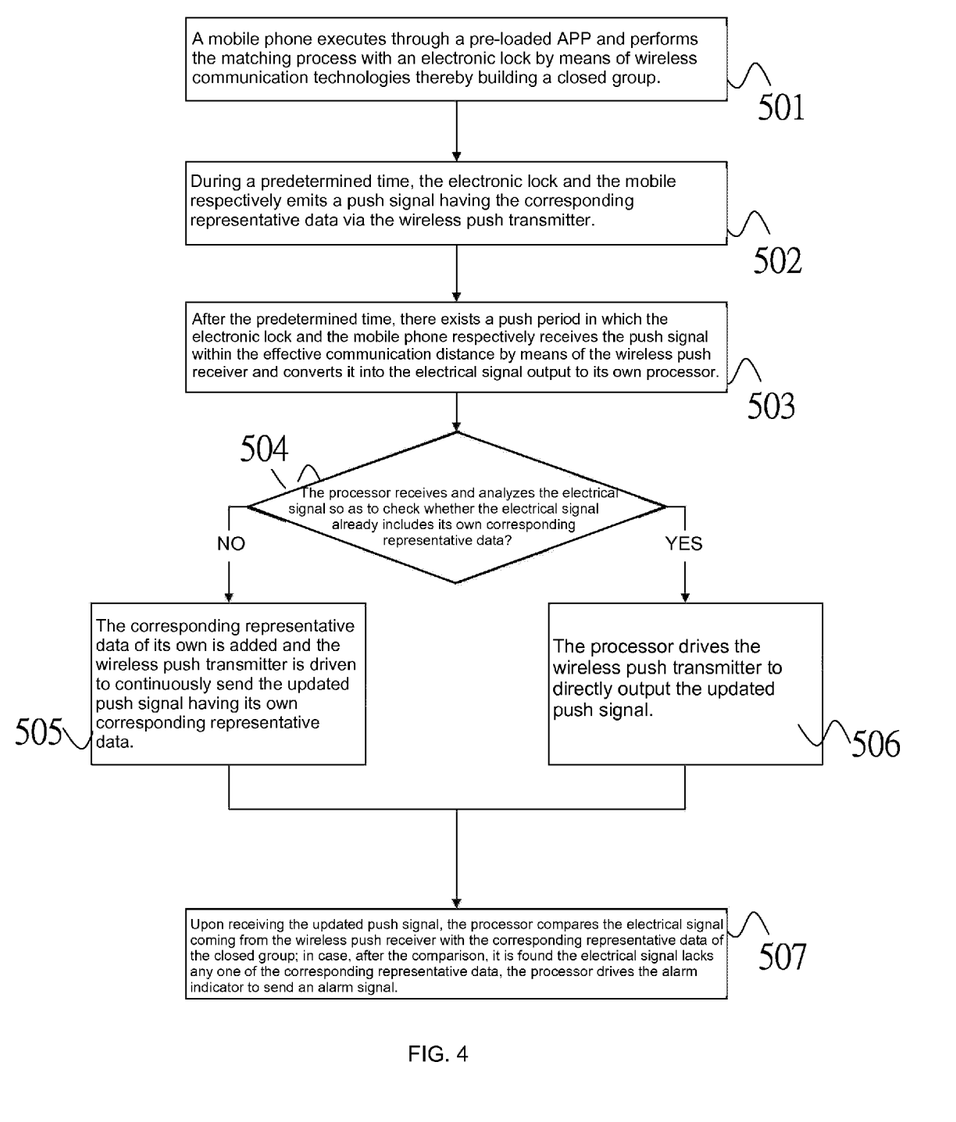
FIG. 4 shows a stepwise flowchart for the remote alarm method of the first preferred embodiment according to the present invention.

As such, in the present embodiment, a flowchart for the remote alarm method according to the present invention is shown in FIG. 4, hereunder referred in conjunction with FIGS. 1 and 2. Initially, as shown in Step 501, the smartphone 3 performs a matching process through a preloaded APP and by means of the wireless communication technologies (e.g., Wi-Fi, iBeacon etc.), thereby building a closed group (not shown) containing only these two items and recording into their respectively owned memory 22, 32. At Step 502, within a predetermined time exemplified as 0.5 second, the electronic lock 2 and the smartphone 3 respectively transmits electro-magnetic waves individually containing the corresponding representative data 21, 31 by means of the wireless push transmitter 23, 33 as the push signal 231, 331. As shown in FIG. 3, since the electronic lock 2 and the smartphone 3 respectively has an effective communication distance 25, 35 of 20 m, both of them are located within the range of the effective communication distance 25, 35 of its counterpart. Next, at Step 503, within an exemplary push period of 1.0 second, the electronic lock 2 and the smartphone 3 respectively receives the push signal 331, 231 by means of the wireless push receiver 24, 34 illustrated as an electro-magnetic coil, and then converts it into the electrical signal (not shown) output to the processor 26, 36.

Figure 5:
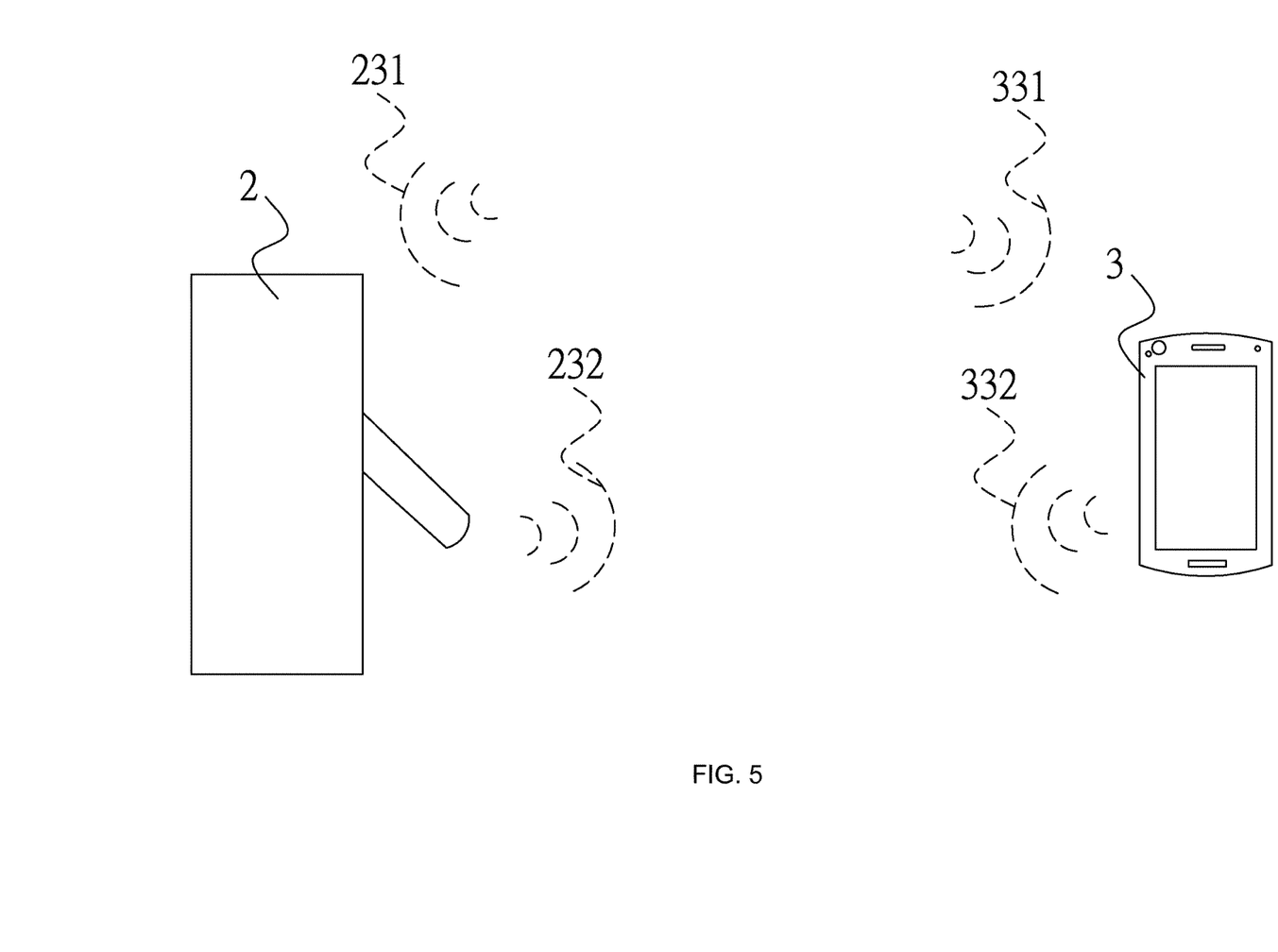
FIG. 5 shows a view for the mobile phone and the electronic lock in FIG. 2, illustrating that, after the wireless push receiver receives the push signal, an updated push signal can be re-outputted.

Further, at Step 504 and as shown in FIG. 5, the processor 26, 36 receives and analyzes the electrical signal. Subsequently, at Step 505, if the electrical signal does not include its own corresponding representative data 21, 31, then its own corresponding representative data 21, 31 will be added therein and the wireless push transmitter 23, 33 will be driven to continuously send an updated push signal 232, 332 which has its own corresponding representative data 21, 31 and is also demonstrated as electro-magnetic waves. On the contrary, if the electrical signal includes its own corresponding representative data 21, 31, as shown at Step 506, the processor 26, 36 drives the wireless push transmitter 23, 33 to directly use the original push signal as the updated push signal 232, 332 output until the push period is over, and afterwards they both enter into a silence period exemplified as a duration of 3.5 seconds, in which no push interactions will be performed.

The processor 36 in the smartphone 3 acting as the main alarm device can, with regards to all of the updated push signals 232, 332 emitted during the push period, check them with each of the members in the closed group thereby verifying whether all the members in the closed group are actually located within the effective communication distance 25, 35. In case any one of them departs from the effective communication distance 25, 35, it indicates the bicycle in the present embodiment has been taken away from the cyclist. Similarly, if there are twenty cyclists together constituting a bicycle fleet, so long as the last (20th) member is still located within the effective communication distance of the 19th cyclist, it is possible to push forwards the corresponding representative data thereof via the 19th cyclist. Consequently, by means of such push operations among the members in the group, the foremost leader can appreciate all the time that none of the rear out-of-eyesight members in the team disengage from the fleet.

So, at Step 507, after the processor 36 completes the comparison, if it finds any one of the corresponding representative data 21, 31 is absent, the processor 36 can drive the alarm indicator exemplified as a speaker 38 to deliver an alarm signal (not marked) exemplified as speaker sounds. On the other hand, it should be noticed that the above-said lacking of any corresponding representative data indicates a condition in which, after having aggregated multiple updated push signals by the main alarm device, the absence of any one of the updated push signals in the closed group still occurs. This can ensure not to immediately drive the speaker to generate sounds by the processor in the mobile phone simply based on the receptions of a portion of the updated push signals in the closed group, thereby preventing undesired mistakes.

Moreover, the electronic lock 2 and the smartphone 3 respectively includes a power supply which is used to provide electric power to the processor 26, 36 and exemplified as a battery set 27, 37, wherein the battery set 27 in the electronic lock 2 can provide electric power by means of the push signal 331 emitted from the smartphone 3 in order to activate the processor 26. When the battery set 27 stores a certain amount of electric energy, the power can be outputted to the processor 26 so as to simplify the structure of the electronic lock and maintain good operation performance Meanwhile, with regards to the mobile phone 3 acting as the main alarm device, the user may habitually keep it operative without depleting the electric power in the battery set 37 thereby eliminating inconvenience in use.

It should be also noticed that, in the present embodiment, a silence period is configured in each push cycle so as to prevent a situation in which any one of the electronic lock and the mobile phone in the closed group actually has already left the effective communication distance but the push signal in the previous round is still sent out continuously, thus reducing the possibility of erroneous determinations made by the processor of the mobile phone. Additionally, the above-said push period and silence period in the present embodiment continuously occur cyclically and are exemplified as 5 seconds, and during each cycle, all updated push signals emitted in the previous round are constantly cleared. Since the transmission speed for electro-magnetic waves are extremely fast, at the beginning of each new cycle, all wireless remote alarm devices send out their push signals and simultaneously receive the push signals from the other alarm devices, and suppose it is found that any one of the received push signals does not include itself, its own corresponding representative data will be added therein accordingly. Therefore, the members located within the range of all effective communication distances can be rapidly appended into the push signal one by one, such that it takes at most 5 seconds to promptly identity that one of the members disengages from the range of all other members.

Of course, those skilled ones in the art can appreciate that, although the alarm indicator is illustrated to be installed on a mobile phone in the present embodiment, the main alarm device in the closed group is by no means restricted simply to one single item, meaning that the alarm indicator can be installed alternatively into the electronic lock on the bicycle or even into both the mobile phone and the electronic lock at the same time, and all of which can achieve the similar functions without affecting the implementation of the present embodiment.

Through the descriptions of the aforementioned present embodiment, several features of the present invention can be clearly identified. It uses wireless communication technologies (e.g., Wi-Fi, iBeacon etc.) to perform the matching process with the electronic lock thereby building a closed group. Besides, based on the limitation of effective communication distance, in case a certain one of the wireless remote alarm devices in the closed group departs from the effective communication distance, the processor in the main alarm device, after having aggregated a great amount of updated push signals, still can not find the corresponding representative data signifying any one of the members in the closed group, the processor can drive the alarm indicator immediately to generate sounds in order to notify the users of all devices in the closed group that an abrupt situation may occur so that the users can deal with the issue right away. Moreover, a mobile phone is herein utilized as the main alarm device, so the user can habitually keep it operative rather than depleting the electric power, and electric power can be supplied to the electronic lock by means of the push signals from the wireless push transmitter via the wireless communication technologies (e.g., Wi-Fi, iBeacon etc.) in order to activate the electronic lock. In this way, the structural design of the electronic lock can be simplified and the user can also operate conveniently according to existing habits without extra troubles in application.

Furthermore, the electronic lock placed on the bicycle may be also configured with an alarm indicator, in which the processor in the electronic lock may gradually lose the updated push signal emitted by the mobile phone when a burglar stealthily moves away the bicycle. On the other hand, the mobile phone may also gradually lose the updated push signal coming from the electronic lock at the same time, such that, once the processors on both sides determine that the counterpart is leaving, the alarm indicators respectively installed on both sides can drive its own alarm indicator to generate sounds in order to attract people's attention on the thief and inform the user of the current condition, thus the burglar can not run away and the security of people's belongings can be well protected.

Figure 6:
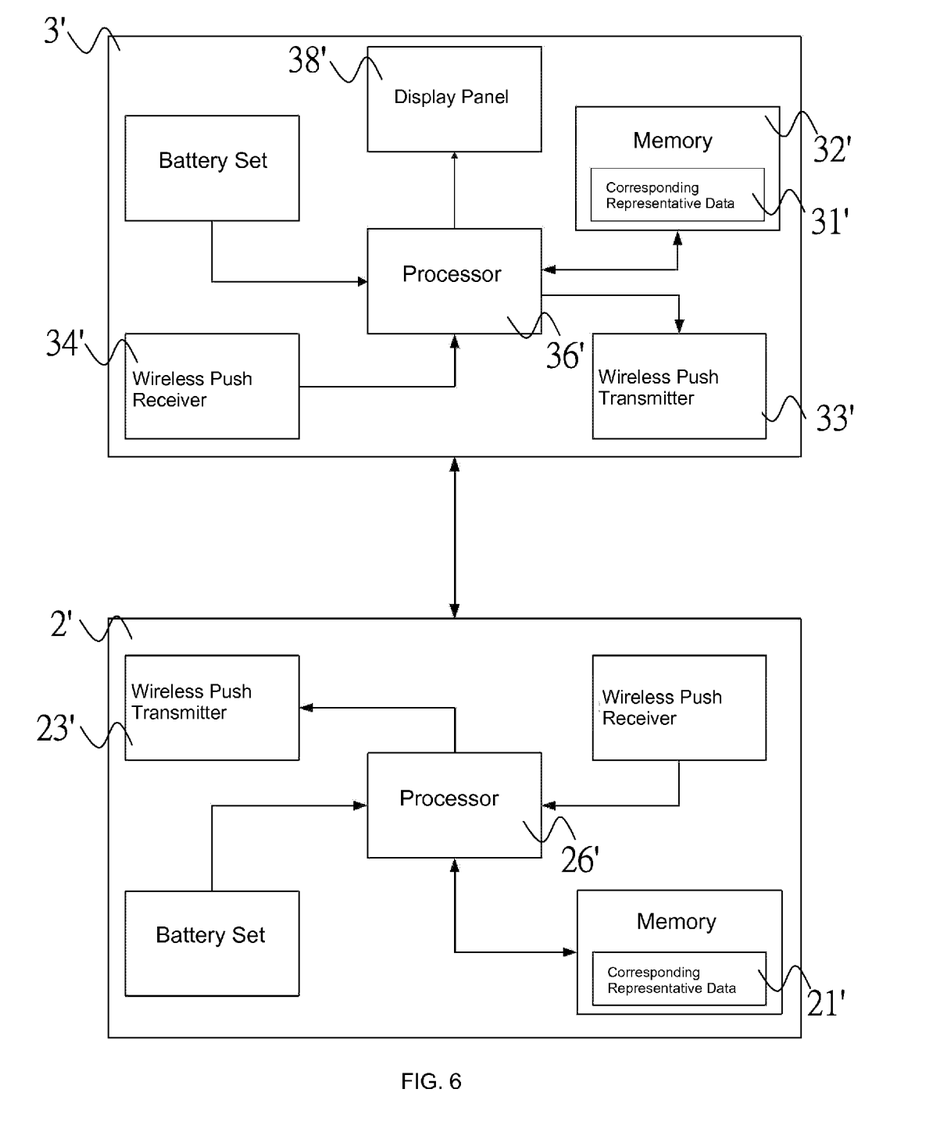
FIG. 6 shows a block diagram for a second preferred embodiment according to the present invention, illustrating the interactions between a tablet computer and a student name card.

Next, a second preferred embodiment according to the present invention is shown in FIG. 6. The structure of the present embodiment is pretty much similar to the previous embodiment, but the difference essentially lies in that the wireless remote alarm device in the present embodiment is embodied as a student name card 2', and the main alarm device illustrated in the previous embodiment is exemplified herein as a tablet computer 3' enabling communication function. Before the tour starts, the guiding teachers can first run the pre-load APP on the tablet computer 3' in their own hand in order to perform the matching process through wireless communication technologies (e.g., Wi-Fi, iBeacon etc.) thereby constructing a closed group (not shown). After the group construction is done, each of the students (for example, 10 students) may have a student name card 2' and be instructed to wear or carry it along with him/her.

Figure 7:
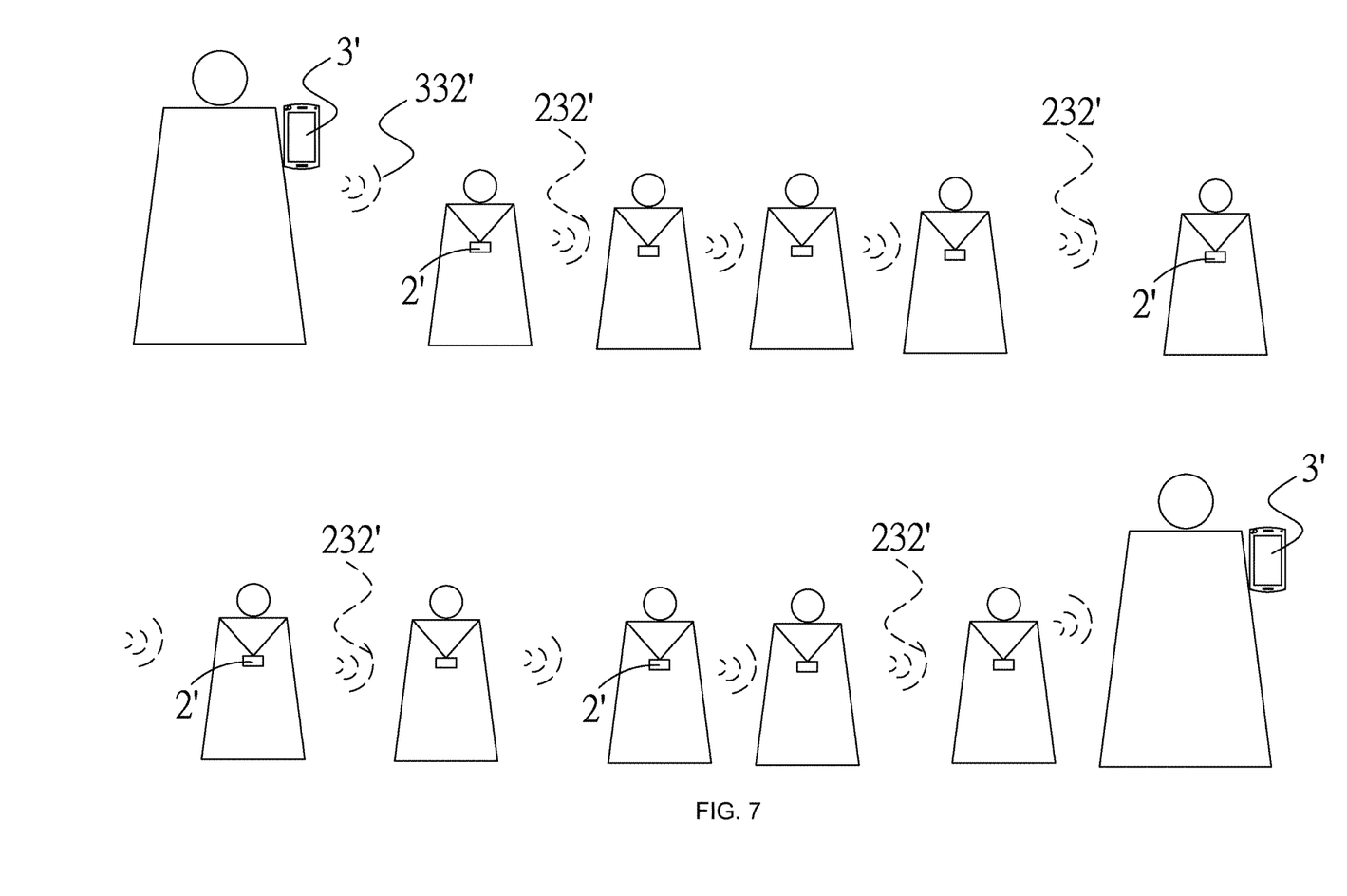
FIG. 7 shows a view for the second preferred embodiment according to the present invention, illustrating the extended effective communication distance of the tablet computer by using the student name cards within a closed group.

As shown in FIG. 7, each of the foremost and the backmost teachers is respectively assigned with a tablet computer 3', while each of the 10 students wears a student name card 2'. Also, it is common that, during a visit to a museum, for example, the students may sometimes separate from each other up to, say, 2 meters. Hence, with the distance of 20 m illustrated in the previous embodiment as an example, this range may cause the effective communication distance (now shown) of the tablet computer 3' held by the foremost teacher unable to reach the effective communication distance of the tablet computer 3' held by the other teacher. Nevertheless, by means of the wireless push technology according to the present invention, the updated push signal 332' coming from the wireless push transmitter 33' in the tablet computer 3' held by the hand of the foremost teacher can be transferred in chain through the effective communication distance of each student name card 2', and, during the transmissions, the wireless push transmitter 23' in each of the student name cards 2' can automatically adjoin its data to the updated push signal 232' emitted by its own student name card 2' and re-output the signal once again. Consequently, in such a relay-pass approach, the effective communication distances of the tablet computers 3' respectively held by the foremost and the backmost teachers can be successfully extended, such that the processors 36' in the tablet computers 3' of the two teachers located at the head and tail positions can precisely control and compare the updated push signals 232', 332' coming from each student name card 2' as well as the counterpart tablet computer 3'. In case any student in the group does disengage from the group up to a cycle time, the processor 36' in the tablet computer 3' may not receive the updated push signal 232' emitted by the student name card 2' worn by the out-of-contact student, so the processor 36' can responsively drive an alarm indicator exemplarily shown as a display tablet 38' in the present embodiment in order to attract the teachers' attention and reveal a warning icon on the display panel 38', such that the teachers can promptly know the current whereabouts of the students and eliminate potential problems.

Figure 8:
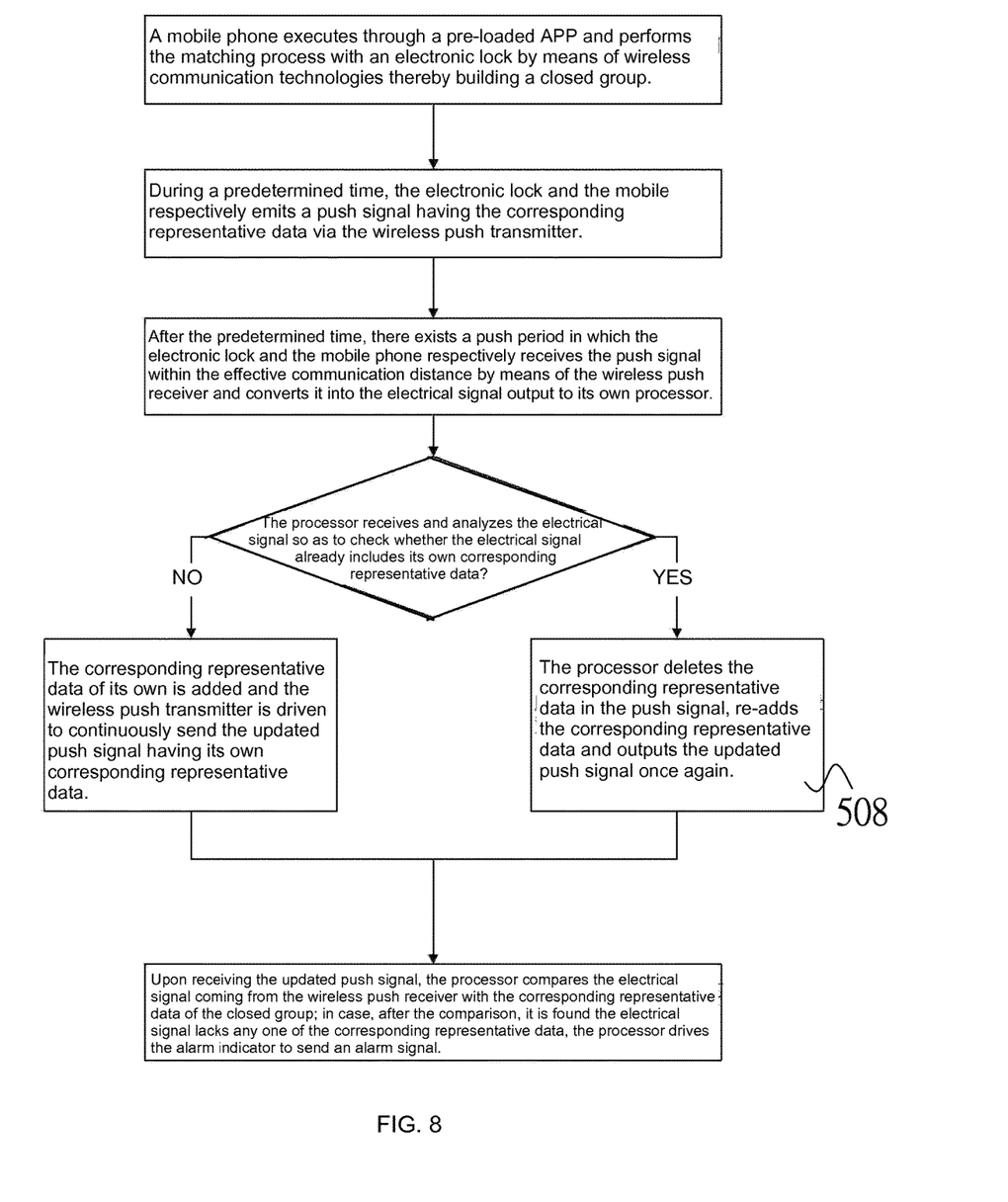
FIG. 8 shows a stepwise flowchart for the remote alarm method of the second preferred embodiment according to the present invention.

The remote alarm method illustrated in the present embodiment and the one set forth in the above-described first embodiment are essentially identical, thus the details thereof are omitted for brevity. The only difference exists at Step 506 of the first embodiment, which is modified in the present embodiment, as shown in the flowchart of FIG. 8 and referred in conjunction with FIG. 6. Suppose any one of the processors 26', 36' analyzes the received electrical signal (not shown) and realizes that the signal has already included its own corresponding representative data 21', 31', then, in order to avoid redundant repetitions, at Step 508, its own corresponding representative data 21', 31' included in the push signal (not shown) will be deleted, re-adding its own corresponding representative data 21', 31' based on relevant operation rules and outputting once again the updated push signal 232', 332'.In the present embodiment, with regards to the updated push signal 232', 332' received by the wireless push receiver 34', the tablet computer 3' acting as the main alarm device can compare it with the data stored in the memory 32', and the speaker illustrated in the previous embodiment can be replaced by a display panel 38' so as to prevent the abrupt warning sound from disturbing students and surrounding people. In this way, the teachers can be aware of the situations and take related measures more quickly, and also maintain their conventional operation habits without unnecessary troubles.

Nevertheless, the aforementioned descriptions simply illustrate the preferred embodiments of the present invention, rather than limiting the scope for the implementations of the present invention thereto; hence, all effectively equivalent changes, modifications or alternations made based on the Claims as well as the contents of the specification in the present invention are deemed to be covered within the scope of the present invention.

What is claimed is:

1. A remote alarm method, which is applicable to an alarm module comprising a plurality of wireless remote alarm devices mutually forming a closed group, with at least one of the wireless remote alarm devices being configured to be a main alarm device; wherein, each of the wireless remote alarm devices respectively has a corresponding representative data; a memory, used to store the corresponding representative data for each of the wireless remote alarm devices in the closed group;
   a wireless push transmitter, used to output a push signal within an effective communication distance; a wireless push receiver, used to receive the push signal transmitted by any other one of the wireless remote alarm devices in the closed group and convert it into an electrical signal output; as well as a processor, and the main alarm device further includes an alarm indicator; in which the remote alarm method comprises the following steps:
   (a) during a predetermined time, at least one of the wireless remote alarm devices sends the push signal including its own corresponding representative data;
   (b) other wireless remote alarm devices located within the effective communication distance from the above-said wireless remote alarm device respectively receive the push signal by means of its own wireless push receiver and convert it into the electrical signal output to its own processor;
   (c) the processor receives and analyzes the electrical signal, and suppose the received electrical signal does not include its own corresponding representative data of the wireless remote alarm device, then the wireless remote alarm device adds its own corresponding representative data therein and drives the wireless push transmitter to continuously send an updated push signal including the added corresponding representative data of its own;
   (d) when the main alarm device receives the updated push signal, the processor in the main alarm device compares the electrical signal coming from its wireless push receiver with the corresponding representative data of all wireless remote alarm devices in the closed group thereby confirming the electrical signal contains the corresponding representative data for each of the devices in the closed group; and
   (e) in case that the electrical signal lacks the corresponding representative data for any one of the wireless remote alarm devices, the processor in the main alarm device drives the alarm indicator to send an alarm signal.

2. The remote alarm method according to claim 1, wherein, after the aforementioned predetermined time in the Step (a), there is a push period for the pushes from each of the wireless remote alarm devices in the closed group; and, after the end of the push period, there is a silence period forbidding the pushes from each of the wireless remote alarm devices in the closed group and allowing the removal of the updated push signal, in which the predetermined time, the push period and the silence period occur continuously in a cyclic state.

3. The remote alarm method according to claim 1, wherein, in the Step (d), the processor checks each corresponding representative data in the closed group after the end of the push period.

4. The remote alarm method according to claim 1, wherein the Step (c) further comprises a push Step (g), and the Step (g) includes the following sub-step:

(g1) in case that the processor finds the electrical signal already has its own corresponding representative data of the wireless remote alarm device during the analyses of the electrical signal, the processor directly outputs the updated push signal.

5. The remote alarm method according to claim 1, wherein the Step (c) further comprises a push Step (h), and the Step (h) includes the following sub-step:

(h1) in case that the processor finds the electrical signal already has its own corresponding representative data of the wireless remote alarm device during the analyses of the electrical signal, the processor deletes the corresponding representative data in the push signal, re-adds the aforementioned corresponding representative data and outputs again the updated push signal.

6. The remote alarm method according to claim 1, wherein, lacking the corresponding representative data of any one of the wireless remote alarm devices as set forth in the Step (c) indicates a status in which, after the main alarm device having aggregated the updated push signals from multiple wireless remote alarm devices, the updated push signal transmitted by any one of the aforementioned wireless remote alarm devices is still absent.

7. An alarm module having multiple wireless remote alarm devices, comprising:
   a plurality of wireless remote alarm devices mutually forming a closed group; wherein, each of the wireless remote alarm devices respectively has a corresponding representative data, and each of the wireless remote alarm devices respectively includes:
      a memory, used to store the corresponding representative data for each of the wireless remote alarm devices in the closed group;
      a wireless push transmitter, used to output a push signal within an effective communication distance;
      a wireless push receiver, used to receive the push signal transmitted by any other one of the wireless remote alarm devices in the closed group and convert it into an electrical signal output; and
      a processor, used to receive the electrical signal from the wireless push receiver and compare the electrical signal, and suppose the electrical signal does not include its own corresponding representative data of the wireless remote alarm device, then the wireless remote alarm device adds its own corresponding representative data therein and drives the wireless push transmitter to continuously send an updated push signal already including the added corresponding representative data of its own; and
   at least one wireless remote alarm device is configured to be a main alarm device among such wireless remote alarm devices, and the main alarm device further includes an alarm indicator such that the processor in the main alarm device analyzes and compares the electrical signal to check whether the electrical signal has already included the corresponding representative data for each of the wireless remote alarm devices, and in case the electrical signal lacks the corresponding representative data for any one of the wireless remote alarm devices, the alarm indicator can be driven to send an alarm signal.

8. The alarm module having multiple wireless remote alarm devices according to claim 7, wherein the alarm indicator is a speaker.

9. The alarm module having multiple wireless remote alarm devices according to claim 7, wherein the alarm indicator is a display panel.

10. The alarm module having multiple wireless remote alarm devices according to claim 7, wherein the main alarm device is a smart communication device.

\* \* \* \* \*